US006207001B1

(12) United States Patent
Steidinger et al.

(10) Patent No.: US 6,207,001 B1
(45) Date of Patent: Mar. 27, 2001

(54) METHOD FOR CUTTING THIN TAPES AND FILMS

(75) Inventors: David John Steidinger, Lake Zurich; Mark Steven Steidinger, McHenry, both of IL (US)

(73) Assignee: Tamarack Products Inc., Wauconda, IL (US)

( * ) Notice: Subject to any disclaimer, the term of this patent is extended or adjusted under 35 U.S.C. 154(b) by 799 days.

(21) Appl. No.: 08/852,708

(22) Filed: May 7, 1997

Related U.S. Application Data

(63) Continuation of application No. 08/488,880, filed on Jun. 9, 1995, now abandoned.

(51) Int. Cl.[7] .............................. B32B 31/00; B26D 1/00; B65A 27/00

(52) U.S. Cl. .......................... 156/264; 156/265; 156/269; 156/270; 83/289; 83/312; 83/313; 226/30; 226/181; 226/186; 226/189

(58) Field of Search .................................... 156/265, 270, 156/269, 230, 264, 256; 83/312, 313, 289; 226/189, 186, 181, 30

(56) References Cited

U.S. PATENT DOCUMENTS

| | | | | |
|---|---|---|---|---|
| 2,990,081 | | 6/1962 | De Neui et al. | 216/21 |
| 3,442,429 | * | 5/1969 | McLellan | 226/191 |
| 3,448,646 | * | 6/1969 | Bishop | 83/313 |
| 4,379,573 | | 4/1983 | Lomeli | 428/42 |
| 4,838,982 | * | 6/1989 | Klaeser et al. | 156/520 |
| 5,011,559 | | 4/1991 | Felix | 156/257 |
| 5,061,334 | | 10/1991 | Paules | 156/235 |
| 5,078,375 | | 1/1992 | Steidinger | 270/52 |
| 5,086,683 | | 2/1992 | Steidinger | 83/674 |
| 5,098,759 | | 3/1992 | Felix | 428/42 |
| 5,211,096 | | 5/1993 | Steidinger | 83/674 |
| 5,224,408 | | 7/1993 | Steidinger | 83/674 |
| 5,324,153 | | 6/1994 | Chess | 412/9 |
| 5,413,651 | | 5/1995 | Otruba | 156/64 |
| 5,441,796 | * | 8/1995 | Steidinger et al. | 428/195 |
| 5,482,593 | | 1/1996 | Kuhn et al. | 156/521 |

OTHER PUBLICATIONS

Tamarack Label Application Brochure dated Sep. 1993 (4 pages).

* cited by examiner

*Primary Examiner*—Linda L. Gray
(74) *Attorney, Agent, or Firm*—James J. Hill; Emrich & Dithmar

(57) ABSTRACT

Improved method and apparatus for cutting or severing thin webs, especially adhesive transfer tapes, and other relatively thin materials which prevents or minimizes tearing.

8 Claims, 3 Drawing Sheets

METHOD FOR CUTTING THIN TAPES AND FILMS

This is a continuation of co-pending application Ser. No. 08/488,880, filed Jun. 9, 1995, now abandoned.

This invention relates to a method and apparatus for cutting thin tapes and films and, more particularly, to such cutting which minimizes or prevents tearing.

BACKGROUND OF THE INVENTION

The Tamarack Label Applicator available from Tamarack Products Inc. of Wauconda, Ill. 60084 is often used to cut and apply pieces of adhesive transfer tape to a moving web of paper. The adhesive transfer tape is unwound from a roll, fed by a feed roller in a controlled proportion to paper web speed. The adhesive transfer tape is then directed via rollers onto a vacuum cylinder, which has a series of holes which apply vacuum to its surface. The vacuum holds the adhesive transfer tape to the surface of the cylinder with the adhesive side of the tape facing away from the surface of the cylinder. The vacuum cylinder is rotating such that the speed of the surface of the cylinder matches the speed of the paper web. A cutoff knife means such as a blade-equipped cylinder is positioned in relation to the vacuum cylinder so that a blade or blades mounted in the cutoff means transversely cuts through the tape riding upon the vacuum cylinder, using the vacuum cylinder as a back-up or anvil surface for the blade or blades to cut against. A piece of tape is thus transversely severed and is carried on the surface of the vacuum cylinder until it is adhesively joined to the moving web of paper. This method and apparatus for applying tape is described by DeNeui, et al, in U.S. Pat. No. 2,990,081.

A problem has been noted when utilizing the above described method and apparatus. Tears and/or tear-outs have been noted in the transversely severed edge of the adhesive transfer tape liner. Tear outs are created by intersecting tears. The tear outs are roughly triangular shaped defects in the otherwise straight cut edge. On close examination, it has been noted that the tape portion causing the tear-out is typically still attached to the preceding cut-off piece of transfer tape. The tear-out can typically be separated very easily at the cut line in spite of the fact that it appears to be torn out of the edge of the previously adjoining piece of liner. We use the terms "tear" and "tears" generally to include a variety of defects at the line of transverse severance—and specifically including "tear outs".

Earlier adhesive transfer tapes, such as those from Ludlow Corporation, located at Chicopee, Mass. 01021, sometimes exhibited the tear-out problem but generally at a tolerable level. The emergence, however, of adhesive transfer tapes with thinner liners from not only Ludlow, who switched from "50#" liner (approximately 0.0028" thick) to "42#" liner (approximately 0.0023" thick), but also United Coating Technologies, located in Plainfield, Ill 60544, whose Free Film Lite tape has a 25# liner (approximately 0.0019" thick) resulted in larger, more frequent, and (thus) more objectionable tear-outs.

The tearing problems are attributable to tension spikes caused by the transverse cutting process. Because the amount of time involved in web severance is very short, the quick increase in tension of the transfer tape web or other web during this time interval is referred to as a tension spike. Thus, a tension spike is the instantaneous change in tension that occurs incident to the act of transverse severance of the web. The invention includes a number of advantageous methods and apparatus incorporating them for ameliorating these problems.

BRIEF DESCRIPTION OF DRAWING:

The invention is described in conjunction with the accompanying drawing in which

FIG. 2 is a fragmentary side elevational view, somewhat enlarged, of a blade-equipped cutoff cylinder and vacuum cylinder about to transversely sever a transfer tape or the like;

Figure 1:
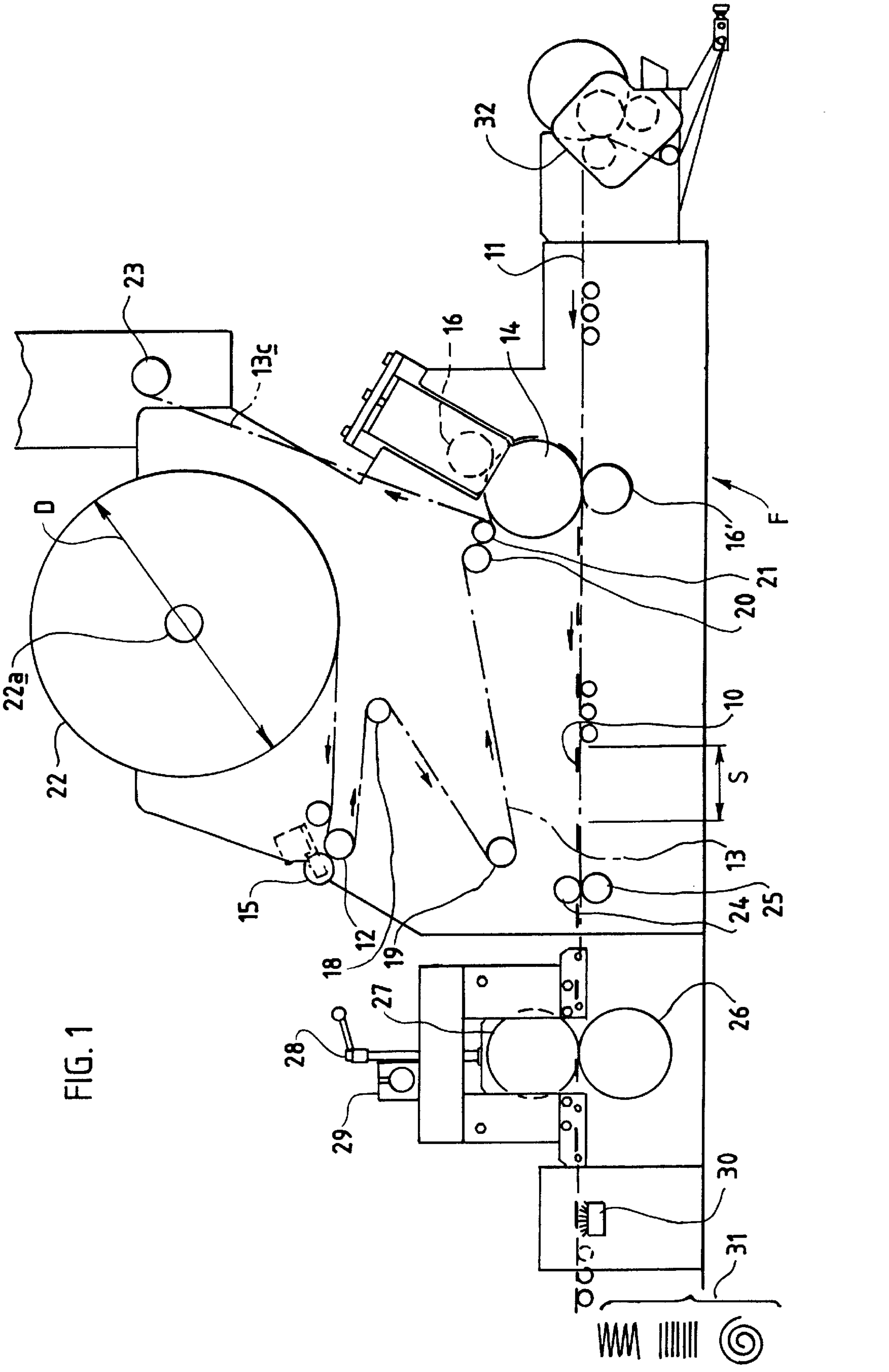
FIG. 1 is a side elevational view, partially schematic, of apparatus used to advantage in the practice of the invention.

DETAILED DESCRIPTION OF THE INVENTION:

Our inventive methods and apparatus to overcome the tearing problems caused by tension spikes are herein described. The prior art Tamarack Label Applicator often applies pieces 10 of adhesive transfer tape to a web of paper 11 provided on a frame generally designated F—see FIG. 1. The web of paper 11 is often divided into repeating intervals or segments S by virtue of spacing between tape applications, transverse perforations, transverse folds, printed marks, or other means.

Since the transfer tape pieces 10 are generally shorter than the repeating interval S of the web 11, the driving feed roller 12 on frame F feeds the transfer tape web 13 at a constant and proportionally slower speed than the speed of the paper web 11. And, since the speed of the surface of the vacuum cylinder 14 which is rotatably mounted on frame F, is the same as the speed of the paper web 11, the transfer tape 13 slips on the surface of the vacuum cylinder 14. Vacuum is supplied to the surface of the vacuum cylinder 14 via drilled openings and pulls the transfer tape web 13 into contact with the vacuum cylinder 14, developing a frictional force which in turn develops a longitudinal force, or tension in the transfer tape web 13. The tension is resisted by the driven feed roller 12 by virtue of gripper wheels 15 (also rotatably mounted on frame F) which hold the transfer tape web tightly against the feed roller 12, a friction-enhancing surface (and also in the case of conventional transfer tapes, a non-stick surface) on the feed roller 12. Such a surface is provided by a flame-sprayed tungsten carbide (from Plasma Coatings Inc. of Bloomington, Minn. 55420) or Tesa 4563 or 4863 Printers' Helper tape (from Tesa Tape Inc., Sparta, Mich. 49345).

A blade equipped cutoff means such as cylinder 16 is rotatably mounted on frame F and suitably located and spaced so that the blade or blades may transversely sever the transfer tape web 13—see FIGS. 2–5. The cutoff cylinder 16 is driven so that the surface speed of the cutting tip of the blade **16*a* is the same as the speed of the paper web 11 and, consequently, the surface speed of the vacuum cylinder 14. When the blade-equipped cutoff cylinder 16 severs the web of transfer tape 13, a piece 10 of transfer tape is generated. The transfer tape piece 10, adhered by vacuum to the surface of the vacuum cylinder 14, immediately accelerates to the surface speed of the vacuum cylinder 14 upon which it is carried until it is brought into contact with the paper web 11. Because the adhesive side of the transfer tape piece 10 faces away from the surface of the vacuum cylinder 14, it may be adhesively joined to the web of paper 11. Even without adhesive, the cut pieces 10 may be used advantageously in other applications. In the illustration given, the adhesive joining is typically assisted by turning off the vacuum supply to the vacuum holes only in proximity to the joining interface, approximately 6 o'clock to 7 o'clock position as viewed in FIG. 1. A counter-impression cylinder 16' is rotatably mounted on frame F and is often used to (a) assure that the transfer tape piece 10 is brought into adhesive contact with the paper web 11** and (b) to ensure positioning accuracy.

An understanding of the tear-out phenomenon may be achieved by carefully considering the sequence of events surrounding the severing operation on a minute time and dimensional scale. This has been illustrated in FIGS. 2–5.

Figure 2:
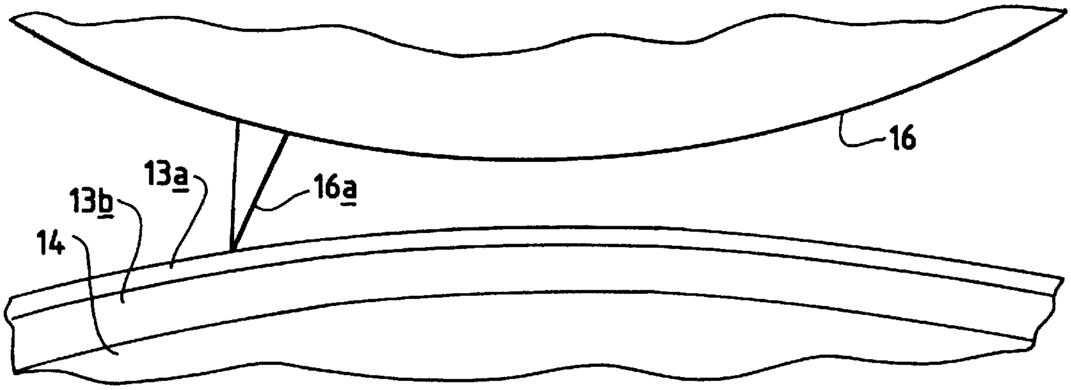

Referring to FIG. 2, a magnified view of the blade-equipped cutoff cylinder 16, the vacuum cylinder 14, and the transfer tape web 13 is provided. The blade in the cutoff cylinder 16 is denoted 16*a*. The transfer tape web 13 has been illustrated as a combination of two layers; a pressure sensitive adhesive 13*a*, and a release liner 13*b*. The showing in FIGS. 2–5 is based on (a) the transfer tape web 13 slipping on the faster moving surface of the vacuum cylinder 14, (b) the tip of the blade 16*a* moving at the same speed as the surface of the vacuum cylinder 14, and (c) the transfer tape web 13 being in tension as a result of the slippage on the vacuum cylinder 14 and because the transfer tape web 13 is being held back by the feed roller 12.

FIG. 2 also represents a point in time when the tip of the blade 16*a* is just entering the adhesive layer 13*a*. At this point in time, the blade 16*a*, by virtue of engaging the surface of the adhesive layer 13*a* and the speed of blade 16*a* being higher than that of the transfer tape web 13, induces an additional tension force in the transfer tape web 13. This action can be likened to that of a paddle wheel contacting and pulling on the transfer tape web 13. Furthermore, the blade 16*a* pinches the transfer tape web 13 against the faster moving surface of vacuum cylinder 14, inducing yet a further additional tension force in the transfer tape web 13.

Figure 3:
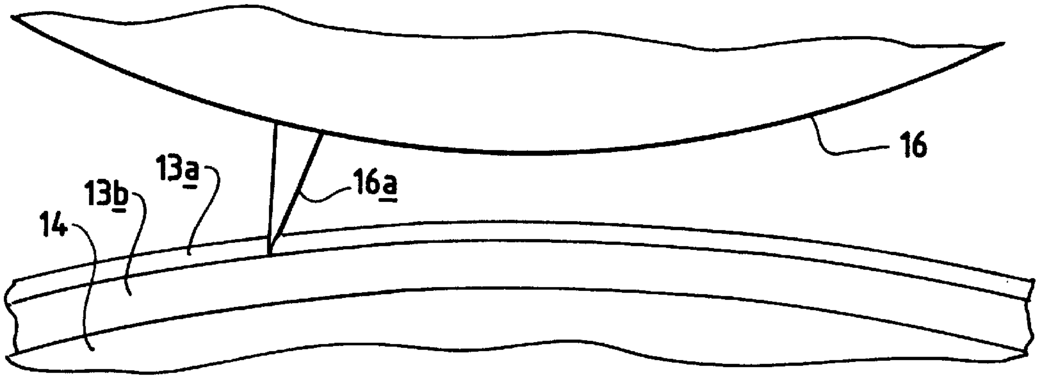
FIGS. 3–5 are all views similar to FIG. 2 but showing the positions of the elements therein in slightly later increments of time.

FIG. 3 represents a subsequent point in time when the cutoff cylinder 16 and vacuum cylinder 14 have advanced slightly in rotation. The blade 16*a* can be seen to have penetrated further into the adhesive layer 13*a*. The increased penetration results in a further increase in the tension force in the transfer tape web 13.

Figure 4:
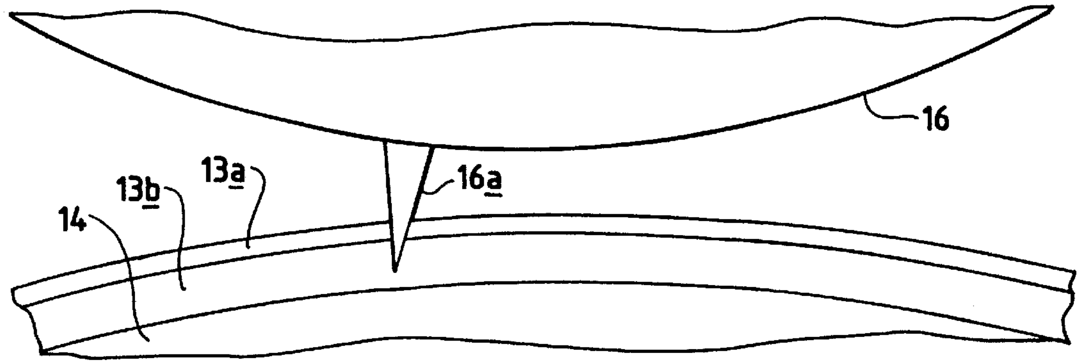

FIG. 4 represents a further point in time when the cutoff cylinder 16 and vacuum cylinder 14 have again advanced slightly in rotation. The blade 16*a* has penetrated all the way through the adhesive layer 13*a* and has begun to penetrate into the liner 13*b*.The tension in the transfer tape web 13 continues to increase.

Figure 5:
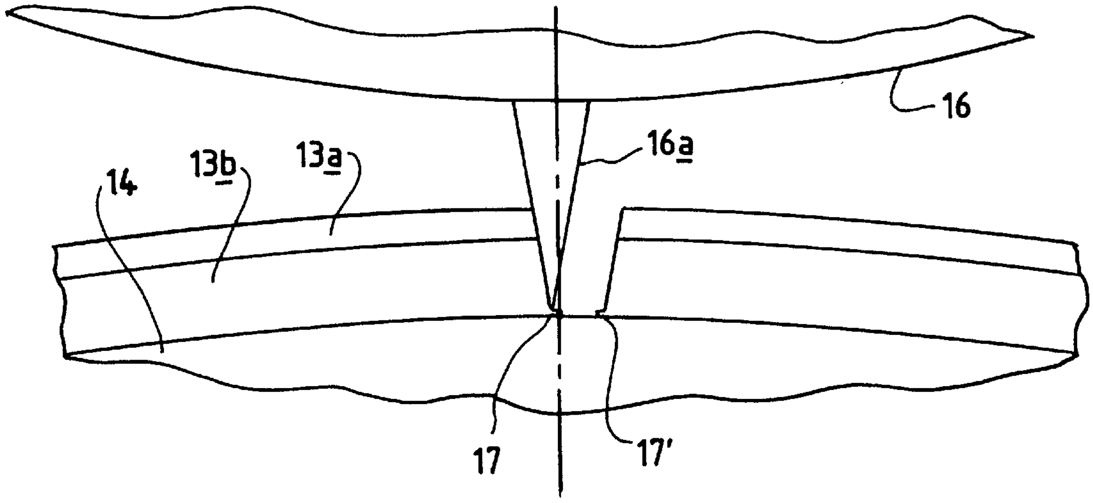

FIG. 5 represents a yet further point in time. The cutoff cylinder 16 and vacuum cylinder 14 have again advanced slightly in rotation. At this point, the blade 16*a* has penetrated all the way through the adhesive layer 13*a* and nearly all the way through the liner 13*b*—to a point 17 which is just slightly spaced from the surface of the web 13 adjacent the vacuum cylinder 14. The transfer tape web 13 has been weakened enough at the point of cutting that the very thin portion 17 remaining in the unpenetrated liner 13*b* fractures or "bursts" as a result of the tension force exceeding the tensile strength of the remaining, unpenetrated liner 13*b*. In most instances, there is a very thin projection from the leading piece as at 17', which is the counterpart of the very thin projection of the trailing portion as at 17. This completes a cutting or severing sequence and results in the formation of a transfer tape piece 10 from the transfer tape web 13. If examined under magnification such as 10X, the transversely cut edges of the transfer tape piece 10 show evidence of the penetration of the blade 16*a* into liner 13*b* and also the fracturing or "bursting" of the unpenetrated portion 17, 17' of the liner 13*b*.

Because the amount of time involved in the representations of FIGS. 2–5 is very short, the quick increase in tension in the transfer tape web 13 during this time interval is referred to as the tension spike.

If the tension spike increases to an excessively high level before the severing of a transfer tape piece 10 is completed, less of the liner 13*b* is penetrated by the blade 16*a* when fracturing or "bursting" occurs. Not only will the thickness of the unpenetrated portion 17, 17' of liner 13*b* increase under these conditions, but also tears will begin to develop, originating at the transversely cut edge and proceeding back into the transfer tape material. These tears are through the entire thickness of the liner 13*b*.

While it would seem apparent that thin transfer tapes would be easier to transversely sever and so would have less tendency to tear, quite the opposite is observed. Transfer tapes with thick (approximately 0.003") and thin (approximately 0.0019") liners 13*b* have similar thickness adhesive layers 13*a* (approximately 0.0007" to 0.001"). As the cutting blade 16*a* penetrates the adhesive layer 13*a* of either the thick or thin transfer tape, a similar tension spike develops. But with the thin transfer tape a thinner, hence weaker liner 13*b* remains to resist the tension spike. So, contrary to initial expectation, thin transfer tapes have a greater tendency to tear at the severed edge and produce undesirable tear outs—two tears originating from the cut edge meeting at a point some distance (typically about 1/16"–1/8") away from the cut edge. This results in a roughly triangular shaped irregularity in the otherwise straight cut edge of a transfer tape piece 10 which we have referred to as a "tear-out".

The tears or tear-outs are unsightly defects in the integral label product. The tear-outs can result in unintended exposure of pressure sensitive adhesive 13*a* which can undesirably bond sheets or plies of the integral label product together, rendering them unusable.

Figure 6:
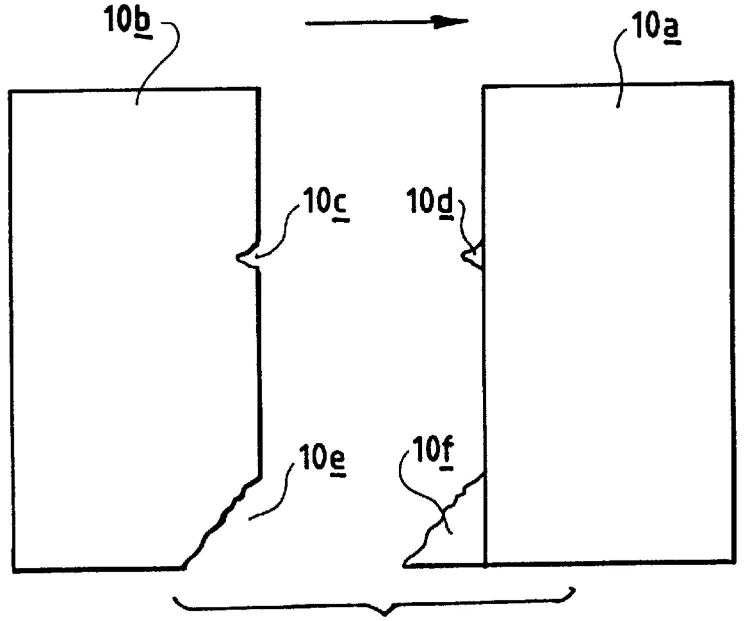
FIG. 6 is an enlarged fragmentary top plan view of a transfer tape web with adhesive side up which has a severed edge and which illustrates aggravated but typical tear-outs.

Illustrative of the unsightly and disadvantageous defects are those depicted in FIG. 6. In FIG. 6, there are shown two portions of the severed web, i.e., the transfer tape. The transfer tape piece 10*a* leading in the direction of transfer tape web movement is shown separated from the trailing piece 10*b*. A typical tear out is that illustrated at 10*c* in the trailing piece lob and its counterpart at the trailing edge of the piece 10*a* is designated 10*d*. Equally disadvantageous is a torn corner as at 10*e* with the complimentary or corresponding piece on piece 10*a* being designated 10*f*.

Several inventive techniques have been developed to minimize and even eliminate the tearing problem by way of reducing the tension spike in the transfer tape web 13.

1. Web Length

Idler rollers 18, 19, 20, and 21 advantageously provide a longer than currently practiced transfer tape web length between the feed roller 12 and the point of cut-off on the vacuum cylinder 14 in order to provide a sufficient transfer tape web length to reduce the tension spike. Existing art apparatus such as the 3M vacuum wheel applicator of U.S. Pat. No. 2,990,081 and earlier Tamarack Label Applicators have a transfer tape web arrangement whereby the length of the transfer tape web between the point of cut-off on the vacuum cylinder 14 and the feed roller 12 happens to be approximately equal to the maximum diameter D of the transfer tape roll 22. The roll 22 is rotatably mounted on frame F via spindle 22*a*.

This practice of spacing is largely due to the normal architecture of the apparatus. Because this architecture contributes to a compact apparatus and a simple web path which is easier for an operator to set up, there is normally no tendency to make the web length significantly longer than this. By advantageously adjusting the web length between the point of cutoff on the vacuum cylinder 14 and the feed roller 12 from approximately 38" or less to a length of approximately 60" or more, the tension spike and transverse edge tearing may be reduced. These web lengths are not specified exactly because of interaction with the following described techniques and also a variability in the physical characteristics of transfer tapes applied or other webs being severed.

2. Vacuum Level

The maximum value of the tension spike may be reduced by providing a means of adjusting the vacuum level to the holes in the vacuum cylinder 14 to a much lower level than previously practiced. In current practice, the tendency is to use the maximum vacuum available from the installed vacuum source, typically a centrifugal, regenerative blower as offered by Gast Manufacturing Corporation, Benton Harbor, Mich. 49023-0097. This is typically 60" to 80" of water. Reducing the vacuum to approximately 20 to 40" of water reduces the tendency for the transfer tape to tear at the transversely severed edges. To some degree, the optimal vacuum level depends on the number of vacuum holes covered by the transfer tape web as it wraps the vacuum cylinder. For example, a wide web of transfer tape will cover more vacuum holes so the desired level of vacuum will be toward the lower end of the 20 to 40" of water range specified. If the vacuum level is set too low the longitudinal or side edges of the transfer tape web 13 tend to curl up from the surface of the vacuum cylinder 14 which can lead to cutting and positioning accuracy problems.

3. Vacuum Cylinder Friction Reduction

The maximum tension spike in the transfer tape web 13 may also be reduced by advantageously reducing the coefficient of friction of the surface of the vacuum cylinder 14. Such friction reducing means may be obtained by polishing, plating or otherwise coating the surface of the vacuum cylinder 14 with a friction reducing material.

4. Mass Coupling Reduction

The tension spike in the transfer tape web 13 may be very effectively and further reduced by reducing the mass coupling of the idler rollers 18, 19, 20, and 21 to the transfer tape web 13. This is practiced by reducing the rotational inertia of the idler rollers 18, 19, 20, and 21. Such reduction can be achieved by light weight material of roller construction such as aluminum, plastic, etc., thinner walls of the rollers and reducing bearing friction. It is further advantageous to reduce the coefficient of friction of the surface of the idler rollers 18, 19, 20, and 21 by employing surface treatments such as polishing, hard coat anodizing, impregnating the surface with dry lubricants—for example, Teflon , graphite, or molybdenum disulfide, and wrapping with silicon release liner or other friction reducing material. It is particularly important that the reduced mass coupling be practiced with respect to those idler rollers in close proximity to the cutting point on the vacuum cylinder 14. This in the case of the illustrated apparatus are idler rollers 20 and 21.

When applying conventional transfer tape (that is those having a single release liner earlier denoted as 13*b*) such as provided by Ludlow, it is typical that the exposed pressure sensitive adhesive comes into contact with the feed roller 12 and at least one other roller (typically the current art counterpart to idler roller 21). Current art apparatus accommodates adhesive contact by providing various non-stick roller coatings such as sandpaper, release liner, Tesa Printer's Helper (#4563 and 4863) silicone rubber tape, Teflon and plasma-sprayed materials from Plasma Coatings, Inc. Another current art approach is to construct the rollers 12 and 21 from non-stick materials such as Delrin or Teflon polymers While the adhesive 13*a* does not stick sufficiently to cause the adhesive to transfer or wrap up onto the "non-stick" rollers, the tackiness of the adhesive still serves to couple the rotational mass of the roller 21 to the transfer tape web 13. Again, mass coupling of idler roller 21, being in close proximity to the transverse cutting point on the vacuum cylinder 14, particularly affects the tendency for tearing at the transversely cut edge of the transfer tape web 13.

In a preferred embodiment of the invention, the reduced mass coupling of the idler roller 21 to the transfer tape web 13 is very effectively practiced by utilizing a two liner transfer tape such as United Coating Technologies° Free Film Lite (which with its thin 25# liner is actually more difficult to transversely sever without tearing) in an inventive new way. The relatively new transfer tape product, Free Film Lite, was developed by United Coating Technologies to address two issues; (1), a desire for a thinner liner with temperature resistant acrylic adhesive to enhance compatibility with laser printers, and (2), a desire for a liner 13*b* which would not wrinkle due to moisture mismatch subsequent to application to a paper web 11. Addressing this second issue resulted in a transfer tape with an additional liner. This means that the pressure sensitive adhesive 13*a*, normally exposed upon unwinding the transfer tape, is instead sandwiched between liner 13*b* and an extra liner 13*c*. The extra liner 13*c* is typically rewound with a rewinder 23—see the upper right of FIG. 1—which provides an adjustable tension sufficient to rewind the extra liner 13*c* and also to separate the extra liner 13*c* from the adhesive 13*a*. When applying Free Film Lite with its extra liner 13*c*, the pressure sensitive adhesive 13*a* is not exposed until the extra liner 13*c* is peeled away. This peeling operation has been done at various locations. For example, the earlier Tamarack Label Applicator operated by peeling the extra liner 13*c* away: a) with a peel bar (which is well known in the art) just after unwinding from the roll of transfer tape 22 (as disclosed in Steidinger et al U.S. patent application 08/258,350, now U.S. Pat. No. 5,441,796). The transfer tape web routing 13, remains essentially unchanged as does the need for non-stick roller treatments. This is an apparent method because it minimizes changes to the apparatus; b) after the feed roller 12, but before other idler rollers contacting the adhesive side of the transfer tape web 13. This eliminates the need for a non-stick treatment for the feed roller 12. This is also an apparent method because of minimal changes to the apparatus.

In the inventive application, the liner 13*c* is peeled away after idler roller 21 and before the cutting operation on the surface of the vacuum cylinder 14. This peeling operation may be done without a peel bar by advantageously positioning idler 21 with respect to the vacuum cylinder 14 to establish a peeling angle sufficient to successfully separate the extra liner 13*c* from the adhesive 13*a*. Thus, the pressure sensitive adhesive 13*a* on the transfer tape web 13 does not contact the feed roller 12 or any idler rollers (18, 19, 20, or 21). This has the desirable effect of providing a large reduction in the coefficient of friction between the transfer tape liner 13*b* and idler roller 21 and consequently the mass coupling to idler roller 21. This very effectively reduces the tension spike and the tendency for tearing at the transversely cut edge. Further benefits are that extra cost non-stick roller treatments such as the commonly used Tesa Printer's Helper are not required on any of the rollers 12, 18. 19, 20 or 21 and the friction inducing peel bar commonly used in the art is eliminated.

5. Use of Quick Change Blade Holding Bars

Also beneficial in reducing tension spikes and, so, the tendency for tearing at the transversely cut edge of the transfer tape web 13 is an inventive new use of the Tamarack Quick Change Blade Holding Bar (U.S. Pat. Nos. 5,086,683; 5,211,096; and 5,224,408). The Tamarack Quick Change Blade Holding Bar is primarily intended to provide quick, easy change of transverse cutting and perforating blades in the paper business forms industry. The Tamarack Quick Change Blade Holding Bar also offers a much finer control of blade extension than other known art and additionally offers a very uniform adjustment of blade extension across the width of the bar, unlike commonly used jack screw equipped blade holding bars which offer uncoordinated, localized blade extension adjustment. These features allow the inventive use of the Tamarack Quick Change Blade Holding Bar which involves transversely severing the transfer tape web 13 more quickly by virtue of an increased cutting force achieved by increasing the extension of the blade 16*a* from the cutoff cylinder 16. Typically, the extra extension amounts to 0.0005" to 0.002" more than current practice. This amount must be carefully controlled or the blade 16*a* will have a relatively short life. This extra extension must also be uniformly provided across the transverse cut or the reduced tendency for tearing of the transfer tape web 13 will not be realized.

6. Providing Idler Rolls With Cushioned Surface

In another embodiment of the invention, idler rolls 18, 19, 20, or 21 are provided with a cushioned surface, such as foam rubber, which will deflect during a tension spike and serve to reduce transfer tape web tearing by reducing the tension spike. Simply wrapping an existing roller with a soft material such as foam rubber or Tesa's Printers' Helper will not yield the desired result. Equivalent or reduced idler roll rotational mass and surface coefficient of friction must accompany the addition of the cushioned surface to realize benefits with this method.

7. Variable Speed Feed Roller

In a further embodiment of the inventive method and apparatus, a feed roller 12 with a means for driving the feed roller 12 at a variable speed will serve to reduce the tension spike by increasing the speed of the transfer tape web so that during the time of the cutting operation, the transfer tape web 13 speed matches or more closely matches the speed of the tip of the cutting blade 16*a*. Prior to and subsequent to the time of the cutting operation, the speed of the feed roller 12 is diminished in a controlled manner so that the appropriate length of transfer tape web 13 is fed to produce the desired length transfer tape pieces 10. In current art, the speed of the feed roller 12 is held essentially constant as it feeds the transfer tape web 13.

The new methods 1–7 and associated apparatus described above which have been beneficial in reducing the occurrence of tears in the transversely cut edge of a transfer tape web are also beneficial in reducing tears in the cut edge of other materials such as paper, glassine, and silicone release liner.

Apparatus and Method Details

After the transfer tape piece 10 has been severed, it is carried on the surface of the vacuum cylinder 14 until it meets with the carrier web 11. At this point the vacuum supply, which is timed by a vacuum manifold, is no longer applied to the transfer tape piece 10. This allows the transfer tape piece 10 to be adhesively joined to the carrier web 11 by means of the exposed pressure sensitive adhesive 13*a*. A counter-impression cylinder 16' is located below the vacuum cylinder 14. The gap between the counter impression cylinder 16' and the vacuum cylinder 14 is adjustable so that the combination of the transfer tape piece 10 and carrier web 11 is lightly gripped. This assures accurate positioning of the transfer tape piece 10 onto the carrier web 11. In some cases, the adjustment of the gap between the counter impression cylinder 16' and the vacuum cylinder 14 is not critical and the counter impression cylinder 16' may even be omitted. This may cause some deterioration of positioning accuracy of the transfer tape piece 10 relative to the carrier web 11.

The carrier web 11 with adhered transfer tape pieces 10 proceeds to a gripper roll assembly consisting of an upper gripper roller 24 and impression roller 25. The position of the upper gripper 24 is adjustable so that the gap between the upper gripper roller 24 and impression cylinder 25 may be adjusted to press the transfer tape piece 10 firmly onto the carrier web 11. By so pressing the transfer tape piece 10, the pressure sensitive adhesive 13*a* is brought firmly and intimately into contact with the carrier web 11. This helps to assure that the pressure sensitive adhesive 13*a* will transfer to carrier web 11.

The carrier web 11 with adhered transfer tape pieces 10 proceeds to a die cutting station consisting of a die cylinder 26 and anvil cylinder 27. Unlike current practice, the die cylinder 26 of the preferred embodiment is located below the anvil cylinder 27. This is especially suited for making integral labels such as those described in U.S. Pat. No. 4,379,573. Integral labels are those die-cut from the carrier web and equipped with adhesive from the release liner piece which also holds the label in place until removal. The arrangement of the cylinders 26, 27 is advantageous because it eliminates the need for the turning bar arrangement used in current art equipment such as offered by Hunkeler of Switzerland. The turning bar arrangement has been used to turn over the carrier web 11 with transfer tape pieces 10 so that the transfer tape pieces 10 are located on the bottom surface of the carrier web 11. This current art (Hunkeler) arrangement allows die cutting with a conventional die cut station, that is, with the die cylinder on the top and the anvil cylinder on the bottom.

In the Preferred Embodiment of the Tamarack apparatus, the die cylinder 26 and the anvil cylinder 27 may be interchanged. This allows the die cutting to be accomplished from either the bottom of the top of the carrier web 11 so that many different form products may be made with the apparatus without the need for a turning bar arrangement.

The die cylinder 26 of the preferred embodiment is magnetic cylinder for magnetically attaching a flexible steel die plate or plates. Flexible steel die plates are available from suppliers such as Rotometrics of Eureka, Mo. 63025, Kocher and Beck of Leicester, LE67 3FW England, and Xynatech of Albuquerque, N. Mex. 87102–0241. This embodiment allows for different shape and size die cuts which are easily and economically changed. Alternatively, the die cylinder may be a cylinder with an engraved die pattern or patterns. Another alternative would be a die cutting apparatus with flat die and anvil plates. At least one of the plates would be movable so as to allow die cutting the carrier web 11. In this alternative, the web 11 with transfer tape pieces 10 move in a stop and go manner to allow the plates to die cut the web 11 when the web is stationary.

The gap between the die cylinder 26 and anvil cylinder 27 on the Tamarack apparatus is adjustable to vary the depth of the die cut. This is very helpful in accommodating different thickness transfer tape liners 13*b*. Different carrier web 11 thickness as well as different cutting characteristics of both the carrier web 11 and the transfer tape pieces 10 often require a different gap setting as well. A finely controlled gap setting is achieved via a fine pitch or differential pitch screw assembly 28 and a measurement readout 29, typically a dial gage indicator with 0.0001" resolution. A light source 30 is placed below the web so that the die cut outline may be sensed by the operator. This allows the operator to accurately position the die cut perimeter with respect to the carrier web or transfer tape patch.

In many cases the die cutting operation may not be required. To accommodate this, the gap between the die cylinder 26 and the anvil cylinder 27 may be increased so that the die cylinder does not cut the carrier web 11 or applied material 10. Or, the flexible steel die plate(s) may easily be removed from the magnetic die cylinder to prevent die cutting.

In other cases it may be desirable to die cut the applied piece 10 and not the carrier web 11. Similarly, it may be desirable to die cut some form products from the top of the web 11 rather than the bottom. This is accommodated by removing the die cylinder 26 and anvil cylinder 27 and replacing them so that the anvil cylinder 27 is mounted below the die cylinder 26. This change is relatively easy to make by virtue of cylinders equipped with bearing blocks which slide into slotted frames and an interchangeable drive gear.

The carrier web 11 with transfer tape pieces 10 may then proceed for further operations such as printing, perforating, folding, cutting into sheets, winding into a roll, and/or collating with other webs or sheets as indicated by the reference number 31.

It has been noted that materials others than transfer tape may be cut and applied with this apparatus. Very often a glue applicator 32 is utilized to apply accurately positioned patterns of adhesive to adhesively join materials such as paper, plastic film, and release liner to the carrier web. The upper gripper roller 24 and lower impression cylinder 25 are especially useful for assuring the adhesive bond between such materials and the carrier web.

Summary of Operation and Apparatus

Our invention which relates to a method and apparatus for handling webs includes the steps of providing feeding means 12, cutting means 14, 16, and applying means 14, 16' for web pieces 10, and providing means for reducing tears or tear outs 10*c*–10*f* in the transversely cut edge 17 of a web 13 by reducing the tension spike in the web during the cutting process. More particularly, the means for reducing the tension spike include at least one but in some cases a combination of the following: (a) increasing the effective web length between said feeding means and the said cutting means, (b) providing a vacuum cylinder and reducing the vacuum level at the surface of the said vacuum cylinder, (c) providing a vacuum cylinder and reducing the coefficient of friction of the surface of said vacuum cylinder, (d) providing rollers in contact with said web between said feeding means and cutting means and reducing the rotational inertia of said rollers, (e) providing rollers between said feeding means and said applying means and reducing the coefficient of friction of said rollers, (f) providing apparatus for cutting a web and which results in tears or tear outs, and cutting said web more quickly in said apparatus, (g) providing a variable speed feeding means, said feeding means being operative to at least closely match the speed of said web to said cutting means, and (h) providing cushioned rollers in contact with the said web prior to cutting.

The combination of steps or tension spikes reducing means may be indicated in instances when there is a change in the specifications of the web material being acted upon. For example, the type of web material 13 being used and the physical characteristics of a given web material 13 such as web tensile strength, web thickness, adhesive (if any) thickness, whether the web 13 is conventional or two-liner transfer tape, web width, length of piece 10 being cut all impact on the cutting step and therefore the tension spike to be reduced.

While in the foregoing specification a detailed description of the invention has been set down for the purpose of illustration, many variations in the details herein given may be made by those skilled in the art without departing from the spirit and scope of the invention.

We claim:

1. A method of handling a continuous, elongated web subject to possible tears upon being transversely severed, comprising:

moving said web longitudinally along a path from a source through feed means and thence to engagement with a first rotating cylinder;

rotating a cutting cylinder carrying at least one blade to bring said blade into contact with a portion of said web supported by said first cylinder thereby to sever said web along a cut line and to form discrete segments of said web on said first cylinder, and characterized in that said blade is moving faster than the feed rate of said web from said feed means, thereby inducing a tension spike in a section of said web between said feed means and said cut line during severing said web; and providing sufficient length in said section of said web between said feed means and said cut line to reduce the tensile stress in said section of said web between said feed means and said cut line to prevent tears in said web incident to severing of said web.

2. The method of claim 1 characterized in that the length of said web in said section between said feed means and said first cylinder is greater than the direct distance between the location at which said web leaves said feed means and at the location at which said blade contacts said first cylinder.

3. The method of claim 1 further including the step of drawing said web from said source by passing said web through feed means comprising a feed roll and a gripper roll, said method further comprising the step of routing said web from said feed means over a plurality of idler rollers to cause said web to form a plurality of path sections, and thence on to said first cylinder.

4. The method of claim 3 further comprising: reducing the mass coupling of said idler rolls between said feed means and said first cylinder thereby to reduce further the tensile stress in said section of said web between said feed means and said first cylinder induced by said severing.

5. The method of claim 1 wherein said first cylinder is a vacuum cylinder for engaging and transporting said discrete segments, said method further comprising providing a low friction surface on at least a portion of said vacuum cylinder supporting said web, thereby to reduce friction between said web and said vacuum cylinder, to permit said web to slip on said supporting cylinder during severing said web.

6. The method of claim 5 including the step of controlling the vacuum at which said vacuum cylinder grips said web thereby to control the slip of said web on said vacuum cylinder to reduce the tension spike upon severing said web.

7. The method of claim 4 wherein said web comprises first and second liners, one of said liners having an adhesive-coated side, and said step of reducing the mass coupling includes separating said first and second liners immediately adjacent said first roll to eliminate contact between said adhesive-coated side of said one liner and said idler rollers.

8. The method of claim 4 wherein said step of reducing said mass coupling comprises reducing the friction between said web and said idler rollers.

* * * * *